United States Patent
Grady

(10) Patent No.: US 7,835,577 B2
(45) Date of Patent: *Nov. 16, 2010

(54) SYSTEM AND METHOD FOR MULTI-LABEL IMAGE SEGMENTATION OF DIGITAL PHOTOGRAPHS

(75) Inventor: Leo Grady, Yardley, PA (US)

(73) Assignee: Siemens Corporation, Iselin, NJ (US)

( * ) Notice: Subject to any disclaimer, the term of this patent is extended or adjusted under 35 U.S.C. 154(b) by 990 days.

This patent is subject to a terminal disclaimer.

(21) Appl. No.: 11/312,937

(22) Filed: Dec. 20, 2005

(65) Prior Publication Data

US 2006/0159343 A1 Jul. 20, 2006

Related U.S. Application Data

(60) Provisional application No. 60/644,860, filed on Jan. 18, 2005.

(51) Int. Cl.
*G06K 9/34* (2006.01)
(52) U.S. Cl. .................................... 382/173
(58) Field of Classification Search ........................ None
See application file for complete search history.

(56) References Cited

U.S. PATENT DOCUMENTS

| 5,929,906 | A | * | 7/1999 | Arai et al. | 348/223.1 |
| 5,956,015 | A | * | 9/1999 | Hino | 345/600 |
| 6,005,967 | A | * | 12/1999 | Nakagawa et al. | 382/154 |
| 6,154,216 | A | * | 11/2000 | Walton | 345/619 |
| 6,249,595 | B1 | * | 6/2001 | Foxall et al. | 382/128 |
| 6,459,433 | B1 | * | 10/2002 | Walton | 345/582 |
| 6,744,923 | B1 | * | 6/2004 | Zabih et al. | 382/226 |
| 7,031,517 | B1 | * | 4/2006 | Le et al. | 382/173 |
| 2004/0086185 | A1 | * | 5/2004 | Sun | 382/224 |
| 2004/0156544 | A1 | * | 8/2004 | Kajihara | 382/167 |
| 2005/0100220 | A1 | * | 5/2005 | Keaton et al. | 382/191 |

OTHER PUBLICATIONS

"Multi-label Image Segmentation for Medical Applications Based on Graph-Theoretic Electrical Potentials", Leo Grady and Gareth Funka-Lea, CVAMIA-MMBIA 2004, LNCS 3117, pp. 230-245, May 15, 2004.*

"Anisotropic interpolation on graphs: The combinatorial Dirichlet problem", Technical Report Cas/CNC-TR-03-14, online, Jun. 21, 2003.*

C. Rother, et al., GrabCut—Interactive Foreground Extraction using Iterated Graph Cuts, ACM Transactions on Graphics (TOG), vol. 23, Issue 3 (Aug. 2004).

Y. Li, et al., Lazy Snapping, SIGGRAPH 2004, (ACM Transaction on Graphics, vol. 23, No. 3, Apr. 2004).

X. Zhu, et al., Semi-Supervised Learning Using Gaussian Fields and Harmonic Functions, Proc. of the 20th Int'l Conf. on Machine Learning (ICML-2003), Washington DC, 2003.

J. Shi, et al., Normalized Cuts and Image Segmentation, IEEE Transactions on Pattern Analysis and Machine Intelligence, vol. 22, No. 8, Aug. 2000.

Boykov, et al., Interactive Graph Cuts, Proc. of Internation Conf. on Computer Vision, Vancouver, Canada, vol. 1, p. 105, Jul. 2001.

* cited by examiner

*Primary Examiner*—Yuzhen Ge

(57) ABSTRACT

A system and method for multi-label image segmentation is provided. The method comprises the steps of: receiving image data including a set of labeled image elements; mapping a change in image data to edge weights; determining potentials for each image element in the image data; and assigning a label, based upon the determined potentials, to each image element in the image data.

35 Claims, 9 Drawing Sheets

SYSTEM AND METHOD FOR MULTI-LABEL IMAGE SEGMENTATION OF DIGITAL PHOTOGRAPHS

CROSS-REFERENCE TO RELATED APPLICATION

This application claims the benefit of U.S. Provisional Application No. 60/644,860, filed Jan. 18, 2005, the disclosure of which is herein incorporated by reference. This application is related to U.S. application Ser. No. 11/029,442 filed Jan. 5, 2005, entitled System and Method for Multi-Label Image Segmentation.

BACKGROUND OF THE INVENTION

1. Technical Field

The present invention relates to image segmentation, and more particularly, to multi-label image segmentation of digital photographs.

2. Discussion of the Related Art

Image segmentation is commonly used, for example, in automatic or semi-automatic image analysis techniques. In such techniques, image segmentation is used to partition a digital image into disjoint connected sets of pixels, each of which corresponds to an object or region before image content can be analyzed, identified, or classified into different groups.

One popular use of image segmentation is in digital photograph editing, where it is often desirable to define a boundary between a main object and background (or between multiple objects) in the photograph. After the photograph is segmented, segments may be extracted from the original photograph, transplanted between photographs, duplicated, modified and edited in various ways.

A variety of methods for image segmentation exist such as: classification-based methods (e.g., thresholding, or multi-dimensional clustering/classification), which use information about a pixel and/or its neighborhood to classify the pixel into one of many segments; edge-based methods (e.g., edge finding and linking), which segment an image based on spatial discontinuity or edge detection; region-based methods (e.g., region growing), which segment an image based on spatial similarity amongst pixels; shape-based methods (e.g., mathematical morphology or template matching), which segment an image based on knowledge of the shape of the object to be segmented; and hybrid methods, which are a combination of one or more of the above methods.

Currently, there exist automatic and semi-automatic techniques for image analysis using various image segmentation techniques. In particular, automatic techniques such as Bayesian methods, normalized cuts, or watersheds typically operate by defining K-way clustering heuristics over image values or values derived from other processes (e.g., spectral coefficients). In an effort to address multi-label segmentation (i.e., an image segmentation technique that simultaneously finds multiple segmentation targets) without resorting to recursively applied binary segmentation, some of these methods attempt to cluster an image into K clusters with either a pre-defined K or a K chosen to satisfy a given criteria. As these are fully automatic methods, there is no user interaction. In addition, the spectral methods are not guaranteed to produce a unique solution and, in some cases, lead to a fully degenerate problem.

Some semi-automatic methods such as graph cuts, marker-based watershed, or region competition have attempted to address multi-label segmentation without resorting to recursively applying binary segmentation. For example, graph cuts does this by finding cuts with a smallest value (as defined by image gradients) that separate each labeled region from all others using 2-way graph cuts. However, extension of this method to K-way partitioning is difficult (for K>2). In addition, this method suffers from the production of segments that minimally encircle user-specified seeds if enough seeds are not placed. Similarly, a machine learning algorithm using Gaussian fields and harmonic functions finds clusters based on harmonic functions using boundary conditions set by a few known points. This algorithm, however, employs methods for similarity measures between points in feature space that are not entirely appropriate for computer vision.

Accordingly, there is a need for a multi-label image segmentation technique that is independent of modality, prior knowledge, and segmentation task, and that allows rapid and easy segmentation of digital photographs.

SUMMARY OF THE INVENTION

The present invention overcomes the foregoing and other problems encountered in the known teachings by providing a system and method for multi-label image segmentation of digital photographs.

In one embodiment of the present invention image data including a set of labeled image elements is received and a change in color space of the image data is mapped to edge weights. Potentials for each image element in the image data are determined and labels are assigned to each image element in the image data based upon the determined potentials. The image data may be marked by a user, for example a digital photograph editor. The image elements may be pixels, and the image data may include unlabeled image elements.

The change in color space of the image data may be mapped to edge weights using the function: $w_{ij}=\exp(-\beta\|C_i-C_j\|)$, where $C_i$ represents a vector of color values at image element i, $C_j$ represents a vector of color values at image element j, $\|\cdot\|$ indicates vector norm, and $\beta$ is a free parameter. In an advantageous embodiment, the color space is correlated with human visual perception. For example, the color space may be the CIE LUV color space.

The potentials for each image element in the image data may be determined by $$L_U X = -BM,$$

where $L_U$ is a reduced Laplacian matrix, X is a set of probabilities for each image element in the image data, B is a joining block between labeled and unlabeled image elements in a Laplacian matrix and M is a set of indicator values for indicating values of the labeled image elements.

The determined potentials represent the probability that a random walker starting at an image element in the image data first reaches a seed point in the image data when set to unity. The label assigned to each image element corresponds to $$\max_s(x_i^s),$$

where $x_i^s$ is the potential at an image element i corresponding to a label s. The labels assigned to each image element may be represented by a color.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
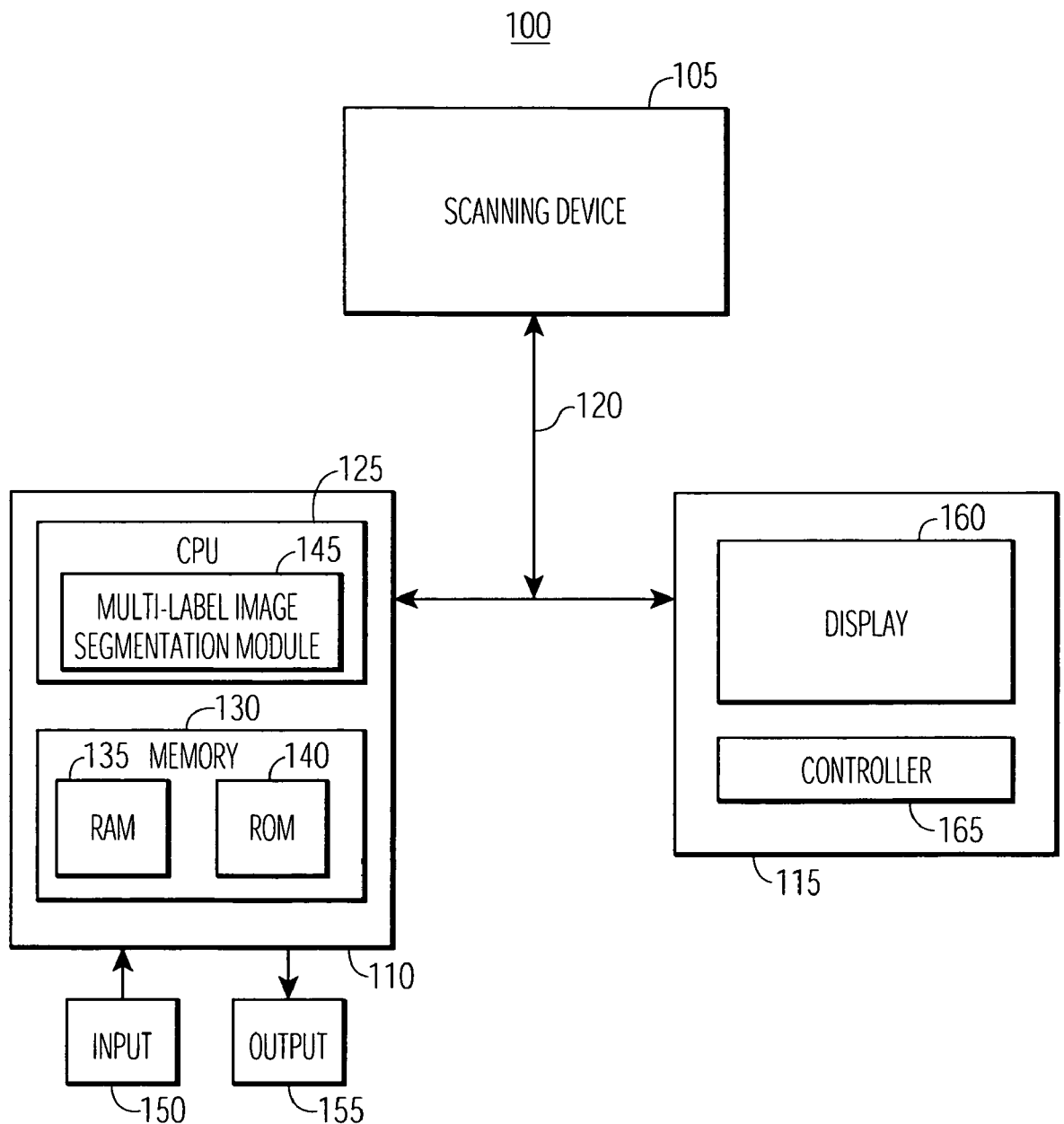
FIG. 1 is a block diagram of a system for multi-label image segmentation according to an exemplary embodiment of the present invention.
Figure 2A:
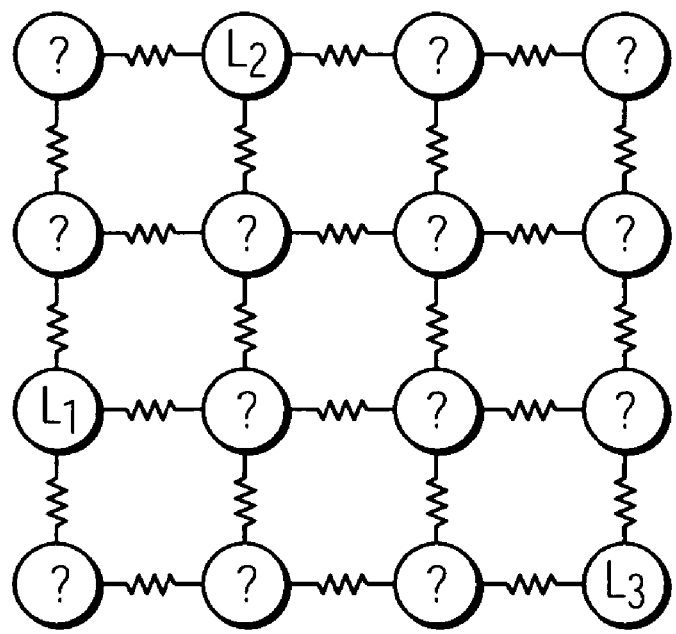
FIG. 2 illustrates segmenting a graph with unit weights in the presence of seeds with different labels using harmonic functions.
Figure 2B:
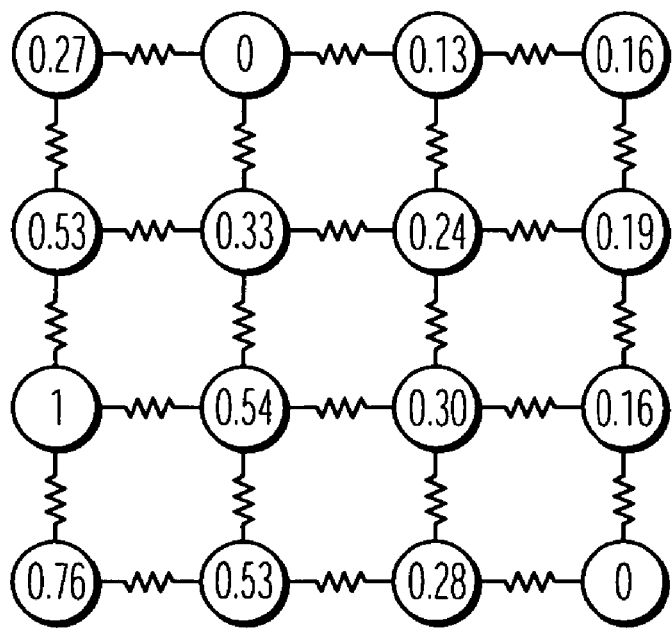
Figure 2C:
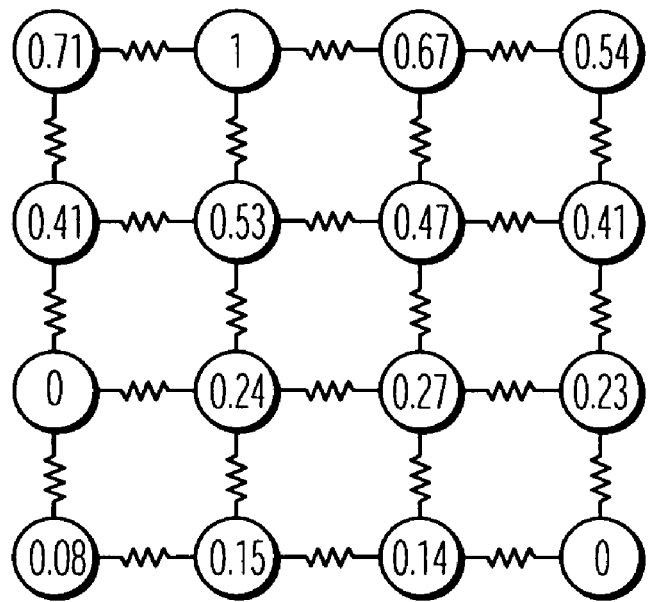
Figure 2D:
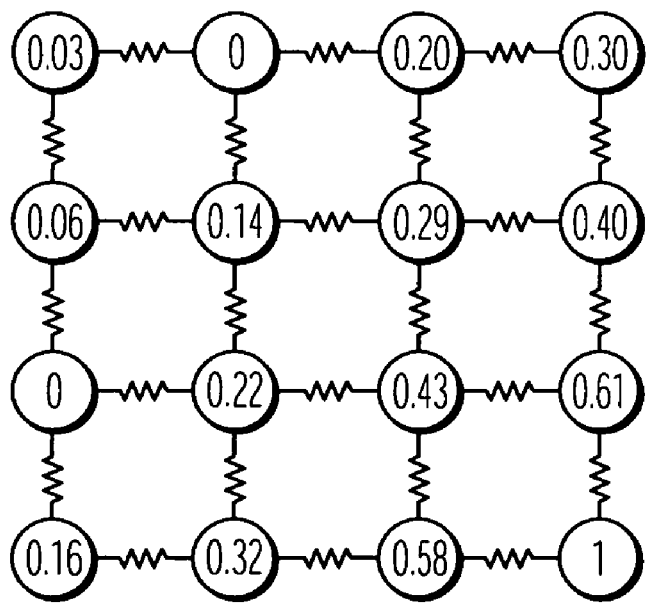

FIG. 1 is a block diagram of a system 100 for multi-label image segmentation according to an exemplary embodiment of the present invention. As shown in FIG. 1, the system 100 includes, inter alia, a scanning device 105, a personal computer (PC) 110 and an operator's console 115 connected over, for example, an Ethernet network 120. The scanning device 105 may be a magnetic resonance (MR) imaging device, a computed tomography (CT) imaging device, a helical CT device, a positron emission tomography (PET) device, a two-dimensional (2D) or three-dimensional (3D) fluoroscopic imaging device, a 2D, 3D, or four-dimensional (4D) ultrasound imaging device, etc. The scanning device 105 may also be a conventional flatbed scanner that takes in an optical image and digitizes it into an electronic image represented as binary data to create a computerized version of a photo or illustration.

The PC 110, which may be a portable or laptop computer, a personal digital assistant (PDA), etc., includes a central processing unit (CPU) 125 and a memory 130, which are connected to an input 150 and an output 155. The CPU 125 includes a multi-label image segmentation module 145 that includes one or more methods for multi-label image segmentation according to an exemplary embodiment of the present invention.

The memory 130 includes a random access memory (RAM) 135 and a read only memory (ROM) 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by a liquid crystal display (LCD), cathode ray tube (CRT) display, printer, etc.

The operation of the system 100 is controlled from the operator's console 115, which includes a controller 165, for example, a keyboard, and a display 160, for example, a CRT display. The operator's console 115 communicates with the PC 110 and the scanning device 105 so that 2D image data collected by the scanning device 105 can be rendered into 3D data by the PC 110 and viewed on the display 160. It is to be understood that the PC 110 can be configured to operate and display information provided by the scanning device 105 absent the operator's console 115, using, for example, the input 150 and output 155 devices to execute certain tasks performed by the controller 165 and display 160.

The operator's console 115 further includes any suitable image rendering system/tool/application that can process digital image data of an acquired image dataset (or portion thereof) to generate and display 2D and/or 3D images on the display 160 using, for example, a 3D graphics card. More specifically, the image rendering system may be an application that provides 2D/3D rendering and visualization of image data, and which executes on a general purpose or specific computer workstation. The PC 110 may also include an image rendering system/tool/application for processing digital image data of an acquired image dataset to generate and display 2D and/or 3D images.

As shown in FIG. 1, the multi-label image segmentation module 145 is also used by the PC 110 to receive and process digital image data, which as noted above, may be in the form of raw image data, 2D reconstructed data (e.g., axial slices), or 3D reconstructed data such as volumetric image data or multiplanar reformats, or any combination of such formats. The data processing results can be output from the PC 110 via the network 120 to an image rendering system in the operator's console 115 for generating 2D and/or 3D renderings of image data in accordance with the data processing results, such as segmentation of organs or anatomical structures, color or intensity variations, and so forth.

Figure 7:
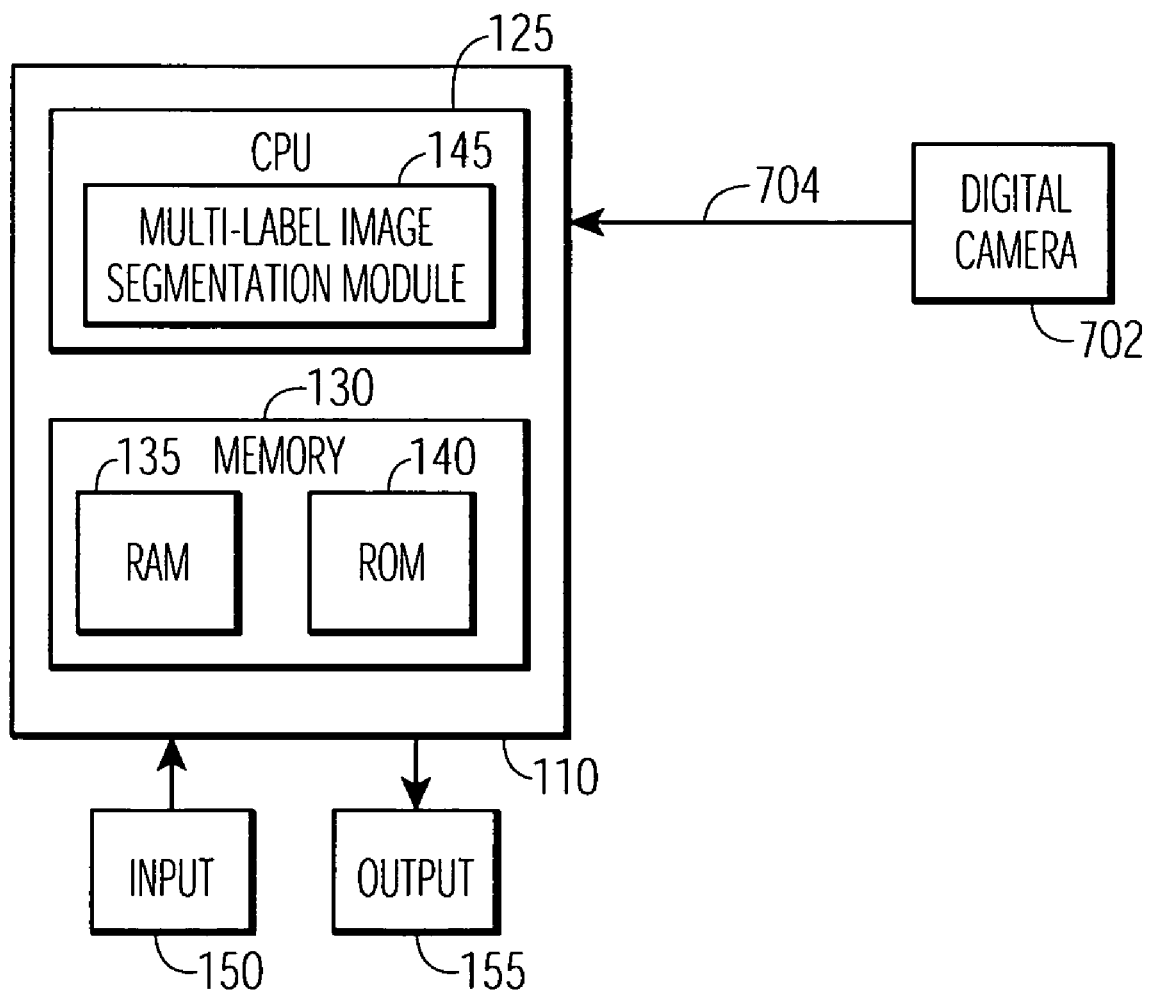
FIG. 7 is a block diagram of a system for multi-label image segmentation according to an exemplary embodiment of the present invention.

FIG. 7 shows an advantageous embodiment of the invention in which the principles of the present invention are applied to segment a digital photograph. FIG. 7 shows PC 110, input 150 and output 155, which are generally as described above in conjunction with FIG. 1. FIG. 7 also shows digital camera 702, which may be any type of well known digital camera which takes photographs and stores them in digital format within a memory device of the digital camera 702. For example, in one embodiment, the digital camera may store digital pictures in the well known JPEG format. Of course, various other digital formats are known for storing digital photographs, any of which may be used by digital camera 702. In a well known manner, digital camera connects to PC 125 via connector 704, which allows for downloading of the digital images from digital camera 702 to PC 125. Connector 704 may be any of the various well known connectors, for example a universal serial bus (USB) connector. Upon downloading, the digital images may be stored within PC 110, for example on a magnetic disk storage device (not shown). When a user of PC 110 desires to edit a stored digital image, the digital image is loaded into RAM 135 so that digital image editing software, executing on CPU 145, may operate on the stored digital image. There are various well known digital image editing software packages available, for example the Photoshop family of software products from Adobe Systems Inc., and the Digital Image family of software products from Microsoft Corp. As shown in FIG. 7, the multi-label image segmentation module 145 may be part of the general digital image editing software executing on CPU 145, or it may be a separate module, working in conjunction with the general digital image editing software.

Before discussing the method for multi-label image segmentation according to an exemplary embodiment of the present invention, the theory and processes by which it was derived will first be discussed.

Multi-Label Image Segmentation Algorithm

It is to be understood that the term "pixel" as used herein refers to a 2D image element and the term "voxel" as used herein refers to a 3D image element. In addition, the algorithm to be presented herein can be applied to image data having 2D, 3D or an arbitrary number of dimensions. For example, the pixels of a digital photograph (2D) may be segmented using the techniques described herein. Further, the voxels of a video sequence (3D) may also be segmented using the techniques described herein. For ease of exposition, the term "pixel" will be used throughout.

The multi-label image segmentation algorithm presented herein is an algorithm that can be used to perform semi-automatic image segmentation given labeled pixels specified by a medical practitioner, a user editing a digital image (e.g., photograph) or computer. The algorithm was formulated by assuming, for example, that a medical practitioner or other use has labeled P pixels (termed "seeds") with one of K labels. Then, for each unlabeled pixel in the set of image data, determining the probability that a random walker starting at this location (i.e., an arbitrary unlabeled pixel) first reaches a seed point with each of the K labels.

Using the algorithm, the probability that a random walker starting at the location first reaches each of the K seed points may be determined without simulating a random walk. Instead, by analogy with circuit theory, these probabilities may be computed by solving a system of linear equations for each label. Thus, a K-tuple vector is computed for each pixel that specifies the probability that a random walker starting from the unlabeled pixel will first reach a seed pixel bearing each of K labels. A final segmentation is then derived from the K-tuples by selecting for each pixel the most probable seed destination for a random walker starting from that location.

In a uniform image (e.g., an all black image), it is known that this segmentation approach will produce a segmentation that roughly corresponds to Voronoi cells for each of the seed points. This segmentation is termed a neutral segmentation because it does not take into account any information from the image. By biasing the random walker to avoid crossing sharp intensity gradients, a quality segmentation is obtained that respects object boundaries including, for example, weak boundaries.

It has been established that the probability a random walker reaches a seed point with a label s equals the solution to the Dirichlet problem obtained by fixing unity Dirichlet boundary conditions at seeds labeled s and fixing a zero boundary condition at seeds with labels not equal to s. The solution to the discrete Dirichlet problem on an arbitrary graph is given by the distribution of electric potentials on the nodes of an electrical circuit with resistors representing the inverse of weights (i.e., the weights represent conductance) and boundary conditions given by voltage sources fixing the electric potential at boundary nodes (i.e., seeds). For the remainder of this discussion, the terminology of circuit theory will be used to describe the algorithm, with, for example a potential $x_i^s$ indicating the probability that a walker starting at node $v_i$ first reaches a seed point with the label s.

A function that solves the Dirichlet problem for a given set of boundary conditions (i.e., the random walker probabilities) is known as a harmonic function. FIG. 2 illustrates harmonic functions and a subsequent segmentation obtained for a 4×4 graph with unit weights in the presence of three seeds with different labels. As shown in FIG. 2, the three seed points with three different labels (i.e., $L_1$, $L_2$, $L_3$), alternately fix the potential of each label to unity (i.e., with a voltage source tied to ground) and set the remaining nodes to zero (i.e., ground). The calculated electric potentials represent the probability that a random walker starting at each node first reaches the seed point currently set to unity. Image (a) of FIG. 2 shows the initial seed points and the segmentation resulting from assigning each node the label that corresponds to its greatest probability. Images (b), (c) and (d) of FIG. 2 show the probability that a random walker starting from each node first reaches seeds $L_1$, $L_2$ and $L_3$, respectively.

In light of the equivalence between random walks on graphs and discrete potential theory, the probability that a random walker starting at pixel $v_i$ first reaches a seed with the label s, is calculated by solving the circuit theory problem that corresponds to a discrete analog of the Dirichlet problem. All seed points belonging to labels other than s are grounded (i.e., their potential is set to zero). A unit voltage source with ground that fixes the s-labeled seeds to have a unit potential is then established.

The electric potentials established at each unlabeled node provide the probabilities that a walker originating from that node will first reach the seed with the label s. The electric potentials may be calculated through the solution of a system of sparse linear equations (described below under the heading "Discrete Dirichlet Problem"). The full K-tuple may be calculated by finding the potentials established through switching "on" (e.g., by providing a unit voltage source thereto) each labeled collection of nodes and "off" (e.g., by grounding) the remaining labeled nodes. As a result, K−1 systems of linear equations must be solved. By linearity (i.e., the principle of superposition in circuit theory), the calculated potentials must sum to unity. This enables one of the systems to be solved by subtracting the sum of the calculated potentials from unity to find the last entry in the full K-tuple.

Before discussing specific aspects of the multi-label segmentation algorithm, a graph must be defined for explanatory purposes. In particular, a graph consists of a pair G=(V, E) with vertices (nodes) v ∈ V and edges e ∈ E ⊆ V×V. An edge, e, spanning two vertices, $v_i$ and $v_j$, is denoted by $e_{ij}$. A weighted graph assigns a value to each edge called a weight. The weight of an edge, $e_{ij}$, is denoted by $w(e_{ij})$ or $w_{ij}$. The degree of a vertex $d_i = \Sigma w(e_{ij})$ for all edges $e_{ij}$ incident on $v_i$. In order to interpret $w_{ij}$ as the bias affecting a random walker's choice, $w_{ij} > 0$ is required. The following discussion will assume the graph is connected.

Edge Weights

In order to represent an image structure (composed of pixels) by random walker biases (i.e., edge weights), a function that maps a change in image pixels (e.g., image pixel intensities for grayscale images) of the image to weights of the underlying graph must be determined. Several known weighting functions may be employed such as the Gaussian weighting function or pre-smoothed variants with various kernels. The main consideration in the design of a function that maps pixel values to weights is that similar pixels should produce a large weight, while dissimilar pixels should produce a small weight. In one embodiment, in which the digital image is a grayscale image, the Gaussian weighting function given by $$w_{ij}=\exp(-\beta(g_i-g_j)^2), \quad [1]$$

will be used. Where $g_i$ indicates the image intensity a pixel i and $g_j$ indicates image intensity at image element j. The value of β is a free parameter.

For color images, the weighting function is given by:

$$w_{ij}=\exp(-\beta\|C_i-C_j\|) \quad [1.1]$$

where $C_i$ represents the vector of color values at pixel i, $C_j$ represents the vector of color values at pixel j and $\|\cdot\|$ indicates vector norm. Various color spaces may be used to set weights in conjunction with equation 1.1. While the red-green-blue (RGB) color space vectors are often used to represent colors, the perceptually near-Euclidean CIE (Commision Internationale de l'Eclairage-International Commission on Illumination) LUV color space is more appropriate for setting weights in conjunction with FIG. 1. The CIE LUV color space is well known in the art, as described in Foley, van Dam, Feiner, and Hughes, Computer Graphics, Addison-Wesley, 1990, which is incorporated herein by reference. Briefly, the CIE standardized XYZ values as tristimulus values that can describe any color that can be perceived by a human observer. This color space is chosen in a way that every perceptible visual stimulus is described with positive XYZ values. The CIE LUV color space, which may be derived from the CIE XYZ color space, provides a perceptually equal color space. The Euclidian distance between two points in the CIE LUV color space is strongly correlated with human visual perception (i.e., two colors that are equally distant in the color space are equally distant perceptually), which makes it appropriate for assigning weights using equation 1.1.

Discrete Dirichlet Problem

As the discrete Dirichlet problem has been thoroughly discussed in previous works such as Norman Biggs' "Algebraic Potential Theory on Graphs" (Bulletin of London Mathematics Society, 1997, 29, pp. 641-682), its application to the multi-label image segmentation algorithm will only be discussed here.

When solving the discrete Dirichlet problem the discrete Laplacian matrix is defined as, $$L_{v_i v_j} = \begin{cases} d & \text{if } i = j, \\ -w_{ij} & \text{if } v_i \text{ and } v_j \text{ are adjacent nodes,} \\ 0 & \text{otherwise,} \end{cases} \quad [2]$$

where $Lv_iv_j$ is used to indicate that the matrix L is indexed by vertices $v_i$ and $v_j$.

The vertices $v_i$ and $v_j$ are partitioned into two sets, $V_M$ (i.e., marked/seed nodes) and $V_U$ (i.e., unmarked nodes) such that $V_M \cup V_U = V$ and $V_M \cap V_U = 0$. $V_M$ contains all seed points irrespective of their labels. The matrix L is reordered as such to reflect its subsets $$L = \begin{bmatrix} L_M & B \\ B^T & L_U \end{bmatrix} \quad [3]$$

Next, the probability (i.e., the potential) assumed at each node, $v_i$, for each label s, by $x_i^s$ is denoted. The set of labels for the seed points are defined as a function $Q(v_j)=s$, $\forall v_j \in V_M$, where $s \in Z, 0<s \leq K$. The marked vector $|V_M|\times 1$ is defined (where |.| denotes cardinality) for each label, s, at node $v_j \in V_M$ as $$m_j^s = \begin{cases} 1 & \text{if } Q(v_j) = s, \\ 0 & \text{if } Q(v_j) \neq s, \end{cases} \quad [4]$$

The combinatorial Dirichlet problem may then be found by solving $$L_U x^s = -Bm^s, \quad [5]$$

which is a sparse, symmetric, positive-definite, system of linear equations with $|V_U|$ number of equations and a number of nonzero entries equal to 2 |E|. Because $L_U$ is guaranteed to be nonsingular for a connected graph, the solution $x^s$ is guaranteed to exist and be unique. Therefore, the potentials for all the labels may be found by solving $$L_U X = -BM, \quad [6]$$

where X has columns taken by each $x^s$ and M has columns given by each $m^s$. Therefore, there are K−1 sparse linear systems to solve, where K is the total number of labels.

Theoretical Properties of the Multi-Label Image Segmentation Algorithm

Several theoretical properties and/or propositions of the multi-label image segmentation algorithm will now be discussed. First, if an interpolation is desired between the solution for a particular image and the neutral segmentation, this may be achieved through the addition of a constant to the weights. Second, an ideal weighting function will produce weights such that the presence of independent random noise at the pixel level produces uncorrelated multiplicative noise at the level of the weights. Finally, it will be shown that a segmentation using the multi-label image segmentation algorithm in the case of pure or almost pure noise is expected to be the neutral segmentation.

The following two properties: (1) a potential $0 \leq x_i^s \leq 1$, $\forall$ i, s (maximum/minimum principle) and (2) the potential of each unlabeled node assumes the weighted average of its neighboring nodes, are discrete analogues of properties of continuous harmonic functions and may be seen directly by viewing the solution to the combinatorial Dirichlet problem as a solution to the discrete Laplace equation (with Dirichlet boundary conditions), where the potential of each unlabeled node must satisfy $$x_i^s = \frac{1}{d_i} \sum_{e_{ij} \in E} w(e_{ij}) x_j^s \quad [7]$$

where $x_j^s \in V$ (may include seed points).

Addressing the first proposition, if the final segmentation is determined from the potentials using the above rule (i.e., the node $v_i$ is assigned to a segment s, only if $x_i^s > x_i^f \forall f \neq s$), then each node assigned to the segment s is connected through a path of nodes also assigned to the segment s and to at least one of the seed points with a label s. In other words, the connected components generated by the final segmentation must contain at least one seed point bearing that label.

The result follows if it can be shown that any connected subset $P \subseteq V_U$ assigned to the segment s must be connected to at least one node that is also labeled s. A block matrix form of equation [7] may be written as $$L_P x_P^s = -R_P x \frac{s}{\overline{P}} \quad [8]$$

where $$x^s = \left[ x_P^s, x \frac{s}{\overline{P}} \right]^T,$$

L has been decomposed into the block form $$L = \begin{bmatrix} L_P & R_P \\ R_P^T & L_{\overline{P}} \end{bmatrix} \quad [9]$$

and $\overline{P}$ denotes the set complement of P in V. For example, in the case of P={$v_i$} in equation [7], $$L_P = d_i \text{ and } -R_P x \frac{s}{\overline{p}} = \sum_{e_{ij} \in E} w(e_{ij}) x_j^s. \text{ If}$$

$$x_{\overline{P}}^s > x_{\overline{P}}^f \forall f \neq s, \text{ then}$$

$$x_{\overline{P}}^s - x_{\overline{P}}^f > 0 \text{ and}$$

$$-L_P^{-1} R_P \left( x \frac{s}{\overline{P}} - x \frac{f}{\overline{P}} \right) > 0.$$

The entries of $R_P$ are nonpositive by definition of L. Because L is an M-matrix, any block diagonal submatrix of the M-matrix is also an M-matrix, and the inverse of the M-matrix has nonnegative entries, then $-L_p^{-1}R$ has nonnegative entries and therefore, some $x_i^s \in \overline{P}$ must be greater than $x_i^f \in \overline{P}$. Further, because the entries of $R_P$ are zero for nodes not connected to P, the nodes in $\overline{P}$ satisfying the inequality must be connected to a node in P.

Proof of the remaining theoretical propositions rest on the following lemma. That is, for random variables, X, A and B, $$X = \frac{A}{B} \cdot E[X] = 0 \text{ if } E[A] = 0 \text{ and } B > 0.$$

Addressing the second proposition, by the Hölder inequality $E[A]=E[X \cdot B] \leq E[X]E[B]$. By the same inequality, $$E[X] = E\left[\frac{A}{B}\right] \leq E[A]E\left[\frac{1}{B}\right].$$

Therefore, $$\frac{E[A]}{E[B]} \leq E[X] \leq E[A]E\left[\frac{1}{B}\right],$$

and the result is provided. Because it is known that there is a relationship between the potentials solved for in equation [5] and the weighted tree structure of the graph. The following relationship for the potential at node $v_i$ in the presence of unit voltage sources (tied to ground) is given by $$x_i^s = \frac{\sum_{TT \in TT_i} \prod_{e_{ij} \in TT} w(e_{ij})}{\sum_{TT \in TT_G} \prod_{e_{ij} \in TT} w(e_{ij})} \quad [10]$$

where $TT_i$ is the set of 2-trees present in the graph, such that node $v_i$ is connected to a seed with a label s, and $TT_G$ is the set of all possible 2-trees in the graph. A 2-tree is defined as a tree with one edge removed. Note that $TT_i \subseteq TT_G \forall v_i$ with equality holding if $v_i$ is the seed point labeled s. In other words, in equation [10], if you sum over the product of the weights in every 2-tree that has $v_i$ connected to a seed with the label s and divide that sum by the sum of the product of the weights of the edges in every 2-tree that exists in the graph, that ratio is equal to the potential found by solving equation [5].

If the weights are uniform as shown in the neutral case, equation [10] yields potentials satisfying $$x_i^s = \frac{|TT_i|}{|TT_G|} \quad [11]$$

Thus, a series of propositions about $x^s$ under different conditions can be proved. For example, if the set of weights $w_{ij}$ are identically distributed (not necessarily independent) random variables, with $w_{ij}>0$, then $E[x_i^s]$ equals the potential obtained in the neutral segmentation. This proposition is proved using the lemma. Next, the potential for the label s at $v_i$ for the neutral segmentation by $n_i^s$ is s denoted. The complement of $TT_i$ in $TT_G$ as $TT_C$ is denoted as $TT_i \cup TT_c$=and $TT_i \cap TT_c$=0. For brevity, the following is also denoted $$S_{TT_i} = \sum_{TT \in TT_i} \prod_{e_{ij} \in TT} w(e_{ij}).$$

$E[x_i^s - n_i^s]$ is given by the following equation, $$E[x_i^s - n_i^s] = E\left[ \frac{S_{TT_i}}{S_{TT_i} + S_{TT_c}} - \frac{|TT_i|}{|TT_i| + |TT_C|} \right]. \quad [12]$$

Because each of the 2-trees will contain an equal number of edges (n-2), and all the weights are identically distributed, $S_{TT_i}$ will contain the sum of $|TT_i|$ identically distributed random variables. For the following discussion μ will denote the mean of the distribution of these new variables.

After combining terms, the numerator of equation [12] is given by $$E[S_{TT_i}(|TT_i| + |TT_C|) - |TT_i|(S_{TT_i} + S_{TT_c})] = \quad [13]$$
$$\mu|TT_i|(|TT_i| + |TT_C|) - |TT_i|(\mu|TT_i| + \mu|TT_C|) = 0$$

and the denominator of equation [12] must be positive because all the $w_{ij}$ are guaranteed to be positive. Therefore, the conditions of the lemma are satisfied for the left hand side of equation [12] to be equal to zero and $E[x_i^s]=n_i^s$.

Because the following two propositions may be proved using the technique just described they will not be proved herein in an effort to avoid repetition. First, if the set of weights $w_{ij}$ are uncorrelated (not necessarily independent) random variables with corresponding means $\mu_{ij}$, then $E[x_i^s]$ equals the potential obtained by setting $w_{ij}=k_{ij}$. Second, if $w_{ij}=k_{ij}y_{ij}$, where the $k_{ij}$ are (not necessarily equal) constants and $y_{ij}$ are identically distributed random variables such that $y_{ij}>0$, then $E[x_i^s]$ equals the potential obtained by setting $w_{ij}=k_{ij}$.

As another proposition, if $w_{ij}=k_{ij}+r$, where $k_{ij}$ are (not necessarily equal) constants and $r$ is a constant added to all weights, $\lim_{r\to\infty} x_i^s = n_i^s$, where $n_i^s$ is the potential obtained in the neutral segmentation. In order to prove this, the potential for node $v_i$ is expressed as $$x_i^s = \frac{\sum_{TT \in TT_i} \prod_{e_{ij} \in TT} (k_{ij}+r)}{\sum_{TT \in TT_G} \prod_{e_{ij} \in TT} (k_{ij}+r)} = \frac{|TT_i|r^{N-2} + O(r^{N-3})}{|TT_G|r^{N-2} + O(r^{N-3})}, \quad [14]$$

where $O(\cdot)$ indicates a term order of no greater than the argument. Thus, by l'Hôpital's Rule, $$\lim_{r\to\infty} x_i^s = \frac{|TT_i|}{|TT_G|} = n_i^s \quad [15]$$

Numerical Practicalities

In order to perform the multi-label segmentation algorithm quickly and effectively any number of techniques used to solve large, sparse or symmetric linear systems of equations may be used. These techniques generally fall into two categories employing direct and iterative methods. A direct method, for example LU decomposition with partial pivoting, has an advantage that the computation necessary to solve equation [6] is only negligibly increased over the amount of work required to solve equation [5]. As current medical data volumes frequently exceed $256\times256\times256\approx16e^6$ voxels and thus require an equal number of equations, most conventional computers do not have enough memory to allow an LU decomposition with that number of equations.

The standard alternative to the class of direct solvers for large, sparse systems is the class of iterative solvers such as the Gauss-Siedel relaxation or conjugate gradients. These solvers have the advantage of a small memory requirement and the ability to represent the matrix-vector multiplication as a function. For example, because the matrix $L_U$ for a lattice has a circulant nonzero structure (although the coefficients are changing), one may avoid storing the matrix entirely. Instead, a vector of weights may be stored (or quickly computed, if memory is at a premium) and the operation $L_U x_U^s$ may be performed in a relatively inexpensive fashion. Further, sparse matrix operations (such as those required for conjugate gradients) may be efficiently parallelized for use on, for example, the CPU 125. Due to the relationship between equation [5] and a finite differences approach to solving the Dirichlet problem on a hypercube domain, techniques for numerical solutions to PDEs (partial differential equations) may also be applied. Most notably, the multi-grid method discussed in Briggs, William and Hansen, Van Emden and McCormick, Steve, "A Multigrid Tutorial", (SIAM Press 2000) achieves near optimal performance when solving, for example, equation [5].

For illustrative purposes, a standard conjugate gradients algorithm with Jacobi preconditioning, representing the matrix-vector multiplication, was implemented on an Intel® Xeon™ 2.4 GHz dual-processor with 1 GB of RAM. Equation [5] was solved using conjugate gradients (having a tolerance=$1e^4$, sufficient for the algorithm) for a 256×256 image with two randomly placed seed points and took 4.831 seconds.

Weak Boundaries

Figure 3A:
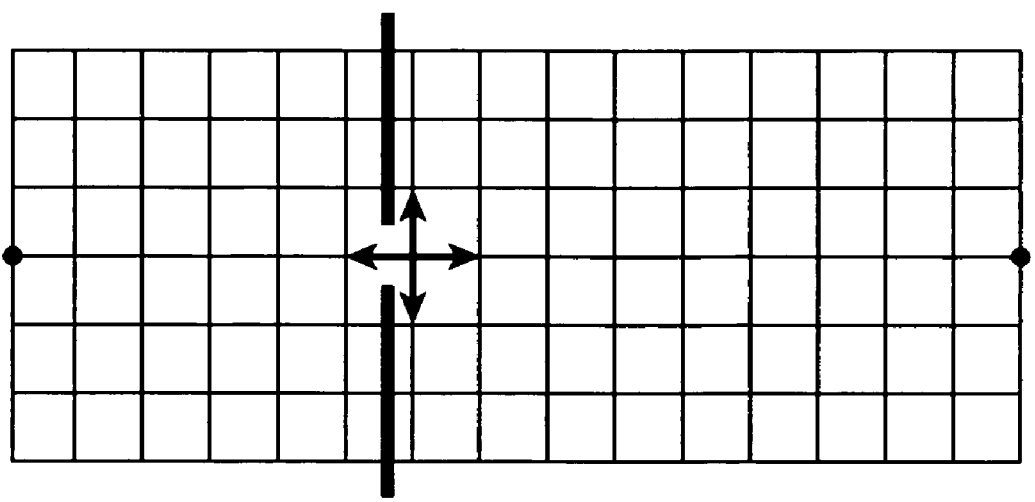
FIG. 3 illustrates segmenting an image with weak boundaries using multi-label image segmentation according to an exemplary embodiment of the present invention.
Figure 3B:
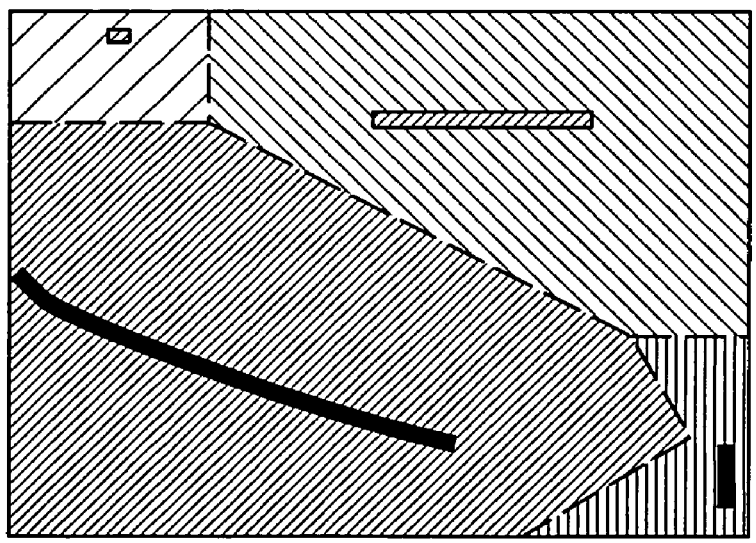

Unlike region growing approaches, one aspect of the random walker motivation for the multi-label image segmentation algorithm is that weak object boundaries will be found when they are part of a consistent boundary. As shown, for example, in image (a) of FIG. 3, a random walker starting on one side of a weak boundary (i.e., a hole in the thick black line) wanders until first striking one of the two labeled nodes or seeds (i.e., the left and right filled circles). On a four-connected lattice, the walker has three initial steps that keep it on one side of the boundary. Because other nodes on that side of the boundary are all very likely to first reach seed I (i.e., the right filled circle), this walker is also very likely to first reach seed 1. For the same reasons, a walker on the other side of the weak boundary is also very likely to first reach seed 2 (i.e., the left filled circle). Consequently, there will be a sharp potential drop over the entire boundary, resulting in the correct segmentation. Image (b) of FIG. 3, shows the segmentation obtained for a synthetic image with four areas of varying sizes and convexity with weak boundaries and a few labeled nodes. Thin black lines represent the "object" boundaries in the image, thick black patches represent the labeled seeds of four different object markers and the shaded regions correspond to the resulting segmentation.

Figure 4:
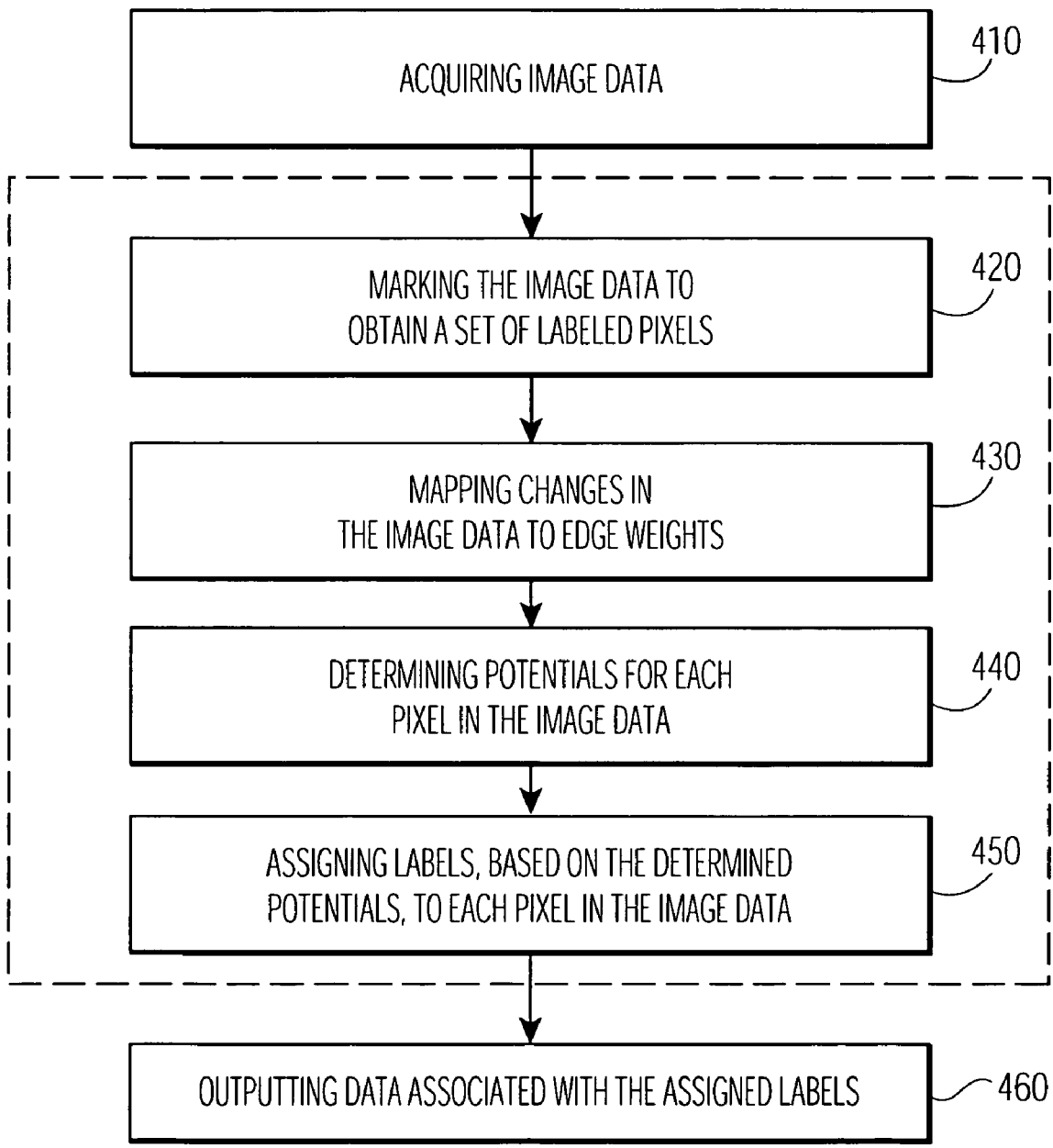
FIG. 4 is a flowchart showing an operation of a method for multi-label image segmentation according to an exemplary embodiment of the present invention.

FIG. 4 is a flowchart showing an operation of a method for multi-label image segmentation according to an exemplary embodiment of the present invention. As shown in FIG. 4, image data is acquired from, for example, a digital camera (step 410). This may be accomplished by uploading image data from the digital camera 702 to the PC 110 as described above in conjunction with FIG. 7. Although the image data is described here as being acquired via the digital camera 702, it is to be understood that the image data may be acquired, for example as described above in conjunction with FIG. 1, using the scanning device 105, in this example a CT scanner, which is operated at the operator's console 115, to scan an anatomical body part thereby generating a series of 2D images associated with the body part. The 2D images of the anatomical body part may then be converted or transformed into a 3D rendered image.

After acquiring the image data, the image data is marked to obtain a set of labeled pixels (step 420). The image data may be marked by a user editing the digital image using, for example, a mouse to select a portion of the image on a display of the PC 110. Alternatively, the image data may be marked by a medical practitioner using, for example, a mouse to select a portion of the image on the display 160 of the operator's console 115. In addition, the marked data could be provided from the PC 110 by using previously marked data stored in its memory 130. Subsequent to marking the image data or receiving the marked image data, a change in intensities of the image data to edge weights is mapped (step 430). The changes in the image data are mapped to edge weights using equation [1] for grayscale images, and using equation [1.1] for color images.

Once the change in intensities of the image data to edge weights is mapped, potentials for each pixel in the image data are determined (step 440). The potentials are determined using equation [6]. After determining the potentials, labels are assigned (using the potentials) to each pixel in the image data (step 450). The assigned labels correspond to $\max_s (x_i^s)$. After the labels are assigned they may then be output to a user for review or to another software program (step 460). For example, the image segmentation output in step 460 may be provided to digital image editing software as described above. Alternatively, the output of step 460 may be output to another software program, used, for example, by the Siemens Medical Solutions Lung Combined Applications to Reduce Exposure (CARE™) package, for analysis (step 460).

Figure 5A:
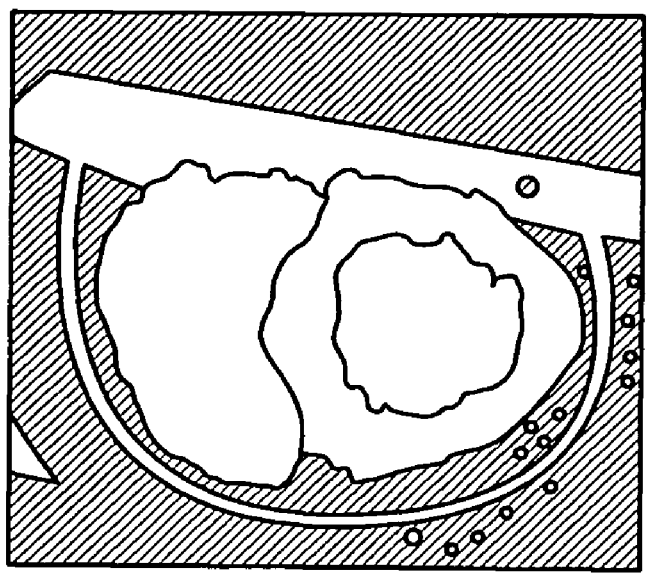
FIG. 5 illustrates segmentation results on cardiac image data using multi-label image segmentation according to an exemplary embodiment of the present invention.
Figure 5B:
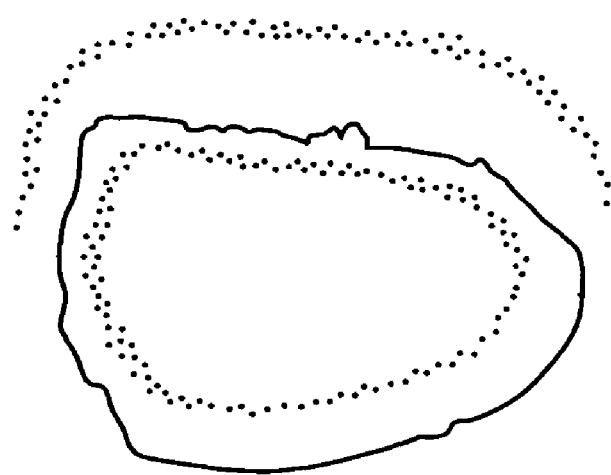
Figure 6A:
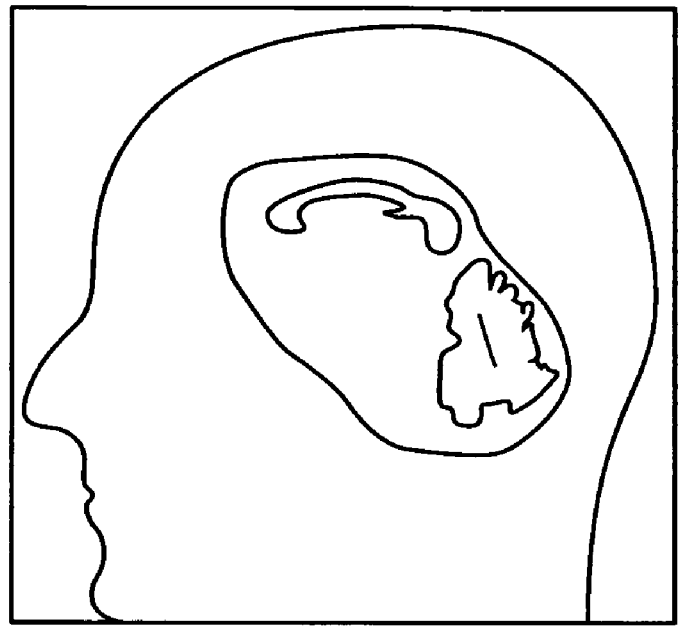
FIG. 6 illustrates segmentation results on brain image data using multi-label image segmentation according to an exemplary embodiment of the present invention.
Figure 6B:
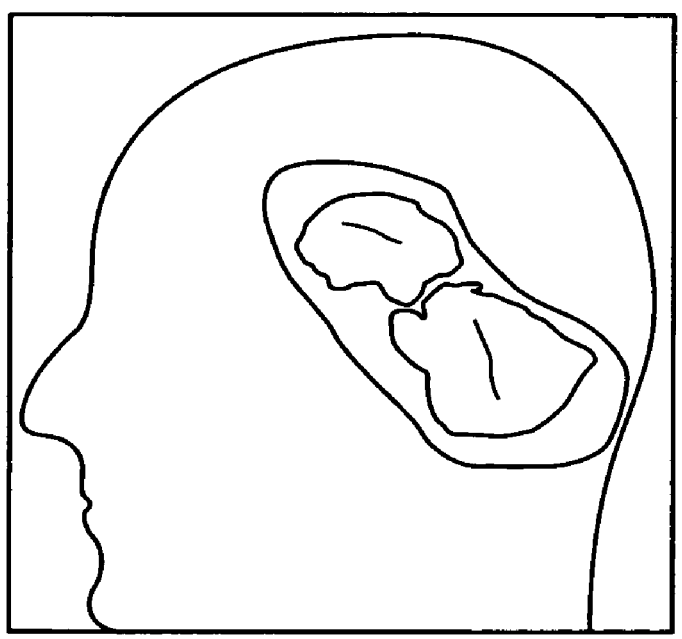

FIG. 5 shows multi-label image segmentation results on two CT cardiac images and FIG. 6 shows multi-label image segmentation results on two MR brain images. The images and seeds demonstrate the general applicability of the semi-automatic multi-label image segmentation approach on objects of varying uniformity, size, shape, contrast, and topology. In FIGS. 5 and 6 the value of the free parameter, $\beta$, in equation [1] was kept constant despite the different characteristics of CT and MR images.

Image (a) in FIG. 5 uses four groups of seeds corresponding to the left ventricle, right ventricle, myocardial wall and the background, while image (b) in FIG. 5 segments the entire heart from the background. Images (a) and (b) of FIG. 6 have three segments each. Image (a) of FIG. 6 shows the corpus callosum and cerebellum segmented from the background and image (b) shows the thalamus and cerebellum segmented from the background.

Figure 8:
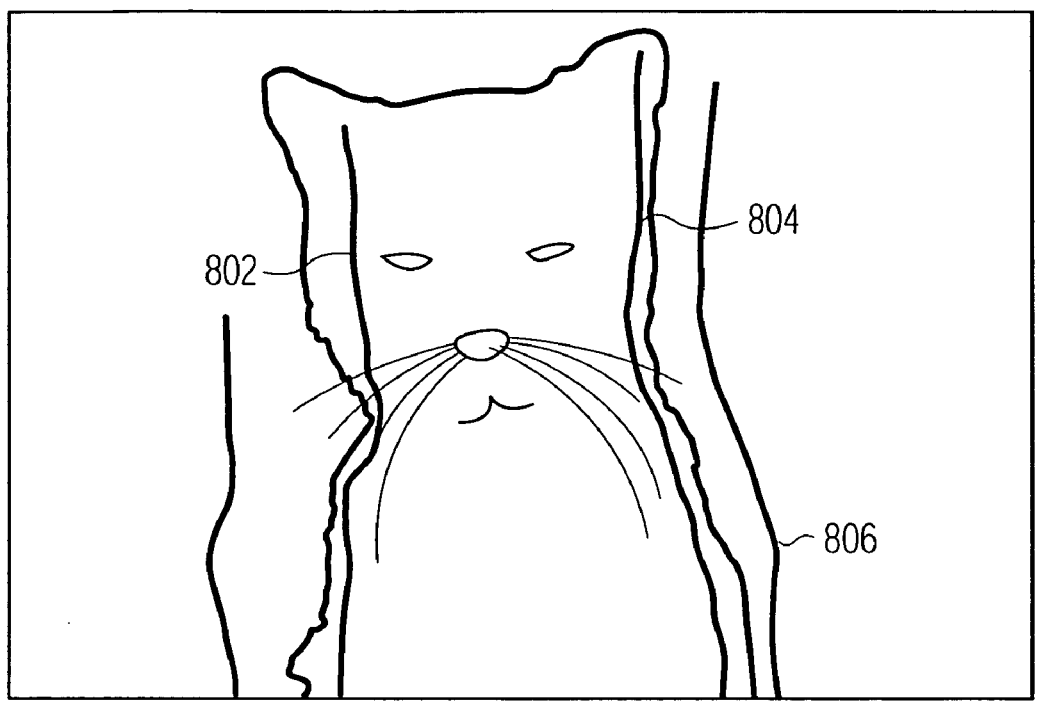
FIG. 8 illustrates segmentation results on a digital photograph using multi-label image segmentation according to an exemplary embodiment of the present invention.
Figure 9:
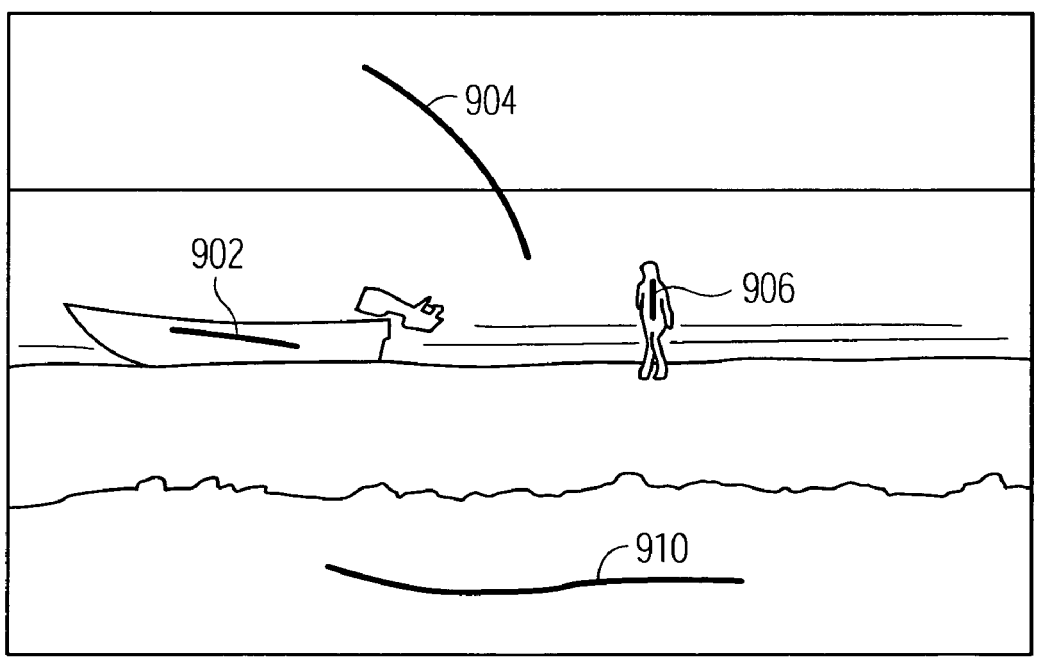
FIG. 9 illustrates segmentation results on a digital photograph using multi-label image segmentation according to an exemplary embodiment of the present invention.

Further examples of multi-label segmentation results are shown in FIGS. 8 and 9. FIG. 8 shows the segmentation of a cat against the background. In FIG. 8, the user has provided initial labeled pixels for the cat 802, 804 and background 806. FIG. 9 shows a segmentation of a photograph into rocks, a woman, boat and background. In FIG. 9, the user has provided initial labeled pixels for the rocks 910, woman 906, boat 902 and background 904.

The multi-label image segmentation algorithm according to an exemplary embodiment of the present invention is based on using a small set of pre-labeled pixels. The pre-labeled pixels may be either generated automatically for a particular purpose, or they may be given directly by a medical practitioner or a photograph editor. The algorithm functions by assigning each unlabeled pixel to the label of the seed point that a random walker starting from that pixel would be most likely to reach first, given that it is biased to avoid crossing object boundaries (i.e., intensity gradients). Because the algorithm is formulated on a general graph, and produces segmentations based on the separation of quantities defined at the nodes (i.e., the potentials), the graph or lattice may represent any dimension or topology.

The algorithm has been demonstrated on real images, for example, in FIGS. 5, 6, 8 and 9, and has shown that it provides a unique solution that is robust to weak object boundaries and that uses a medical practitioner's or photograph editor's labeling choices. Further, there is only one single free parameter, $\beta$, in equation [1], and all the segmentations shown in FIGS. 5, 6, 8 and 9 were computed using equation [1] and the same parameter (with $\beta=900$). It is to be understood, however, that the algorithm according to the present invention could be used with pre-filters (e.g., median) or post-filters (e.g., clustering) to produce enhanced results. In addition, because the PDE (basically a Laplace equation with Dirichlet boundary conditions) is formulated on a graph there are limited, if any, concerns about discretization errors or variations in a hardware implementation.

It is to be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention.

It is therefore intended that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for multi-label image segmentation, comprising:
   receiving image data including a set of labeled image elements;
   mapping a change in color space of the image data to edge weights, wherein said change in color space is mapped using the function:
   $w_{ij}=\exp(-\beta\|C_i-C_j\|)$ where $C_i$ represents a vector of color values at image element i, represents a vector of color values at image element j, $\|\bullet\|$ indicates vector norm, and $\beta$ is a free parameter;
   determining by a processor potentials for each image element in the image data, wherein the determined potentials represent the probability that a random walker starting at an image element in the image data first reaches a seed point in the image data when the probability of the seed point is set to unity; and
   assigning a label, based upon the determined potentials, to each image element in the image data.

2. The method of claim 1 wherein said image data is a digital photograph.

3. The method of claim 1, wherein the image data is marked by a user.

4. The method of claim 1, wherein the image elements are pixels.

5. The method of claim 1, wherein the image elements are voxels of a video sequence.

6. The method of claim 1, wherein the image data includes unlabeled image elements.

7. The method of claim 1, wherein said color space is correlated with human visual perception.

8. The method of claim 7 wherein said color space is CIE LUV color space.

9. The method of claim 1, wherein the change in color space of the image data to edge weights is mapped to represent the image data with random walker biases.

10. The method of claim 1, wherein the potentials for each image element in the image data are determined by $$L_U X = -BM,$$

where $L_U$ is a reduced Laplacian matrix, X is a set of probabilities for each image element in the image data, B is a joining block between labeled and unlabeled image elements in a Laplacian matrix and M is a set of indicator values for indicating values of the labeled image elements.

11. The method of claim 1, wherein the label assigned to each image element corresponds to $$\max_s(x_i^s),$$

where $\max_s$ is to maximize over variable s which takes value from a set of labels and $x_i^r$ is the potential at an image element i corresponding to a label s.

12. The method of claim 1, further comprising:
outputting the assigned label.

13. The method of claim 1, further comprising:
acquiring the image data.

14. A system for multi-label image segmentation, comprising:
a memory device for storing a program;
a processor in communication with the memory device, the processor operated with the program to:
receive image data including a set of labeled image elements;
map a change in color space of the image data to edge weights, wherein said change in color space is mapped using the function:
$w_{ij} = \exp(-\beta \|C_i - C_j\|)$ where $C_i$ represents a vector of color values at image element i, $C_j$ represents a vector of color values at image element j, $\|\cdot\|$ indicates vector norm, and $\beta$ is a free parameter;
determine potentials for each image element in the image data, wherein the determined potentials represent the probability that a random walker starting at an image element in the image data first reaches a seed point in the image data when the probability of the seed point is set to unity; and
assign a label, based upon the determined potentials, to each image element in the image data.

15. The system of claim 14 wherein said image data is a digital photograph.

16. The system of claim 14, wherein the image data is marked by a user.

17. The system of claim 14, wherein the image elements are pixels.

18. The system of claim 14, wherein the image elements are voxels of a video sequence.

19. The system of claim 14, wherein the image data includes unlabeled image elements.

20. The system of claim 14, wherein said color space is correlated with human visual perception.

21. The system of claim 20 wherein said color space is CIE LUV color space.

22. The system of claim 14 wherein the change in color space of the image data to edge weights is mapped to represent the image with random walker biases.

23. The system of claim 22, wherein the random walker is biased to avoid crossing object boundaries.

24. The system of claim 14, wherein the potentials for each image element in the image data are determined by $$L_U X = -BM,$$

where $L_U$ is a reduced Laplacian matrix, X is a set of probabilities for each image element in the image data, B is a joining block between labeled and unlabeled image elements in a Laplacian matrix and M is a set of indicator values for indicating values of the labeled image elements.

25. The system of claim 14, wherein the label assigned to each image element corresponds to $$\max_s(x_i^s),$$

where $\max_s$ is to maximize over variable s which takes value from a set of labels and $x_i^s$ is the potential at an image element i corresponding to a label s.

26. The system of claim 14, wherein the processor is further operative with the program code to:
output the assigned label.

27. The system of claim 14, wherein the processor is further operative with the program code to:
acquire the image data via a digital camera.

28. A computer readable medium having computer program logic recorded thereon for multi-label image segmentation, the computer program logic comprising:
program code for receiving image data including a set of labeled image elements;
program code for mapping a change in color space of the image data to edge weights, wherein said change in color space is mapped using the function:
$w_{ij} = \exp(-\beta \|C_i - C_j\|)$ where $C_i$ represents a vector of color values at image element i, $C_j$ represents a vector of color values at image element j, $\|\cdot\|$ indicates vector norm, and $\beta$ is a free parameter;
program code for determining potentials for each image element in the image data, wherein the determined potentials represent the probability that a random walker starting at an image element in the image data first reaches a seed point in the image data when the probability of the seed point is set to unity; and
program code for assigning a label, based upon the determined potentials, to each image element in the image data.

29. The computer readable medium of claim 28 wherein said image data represents a digital photograph.

30. The computer readable medium of claim 28 wherein said color space is correlated with human visual perception.

31. The computer readable medium of claim 30 wherein said color space is CIE LUV color space.

32. A system for multi-label image segmentation, comprising:
means for receiving image data including a set of labeled image elements;
means for mapping a change in color space of the image data to edge weights, wherein said change in color space is mapped using the function:
$w_{ij} = \exp(-\beta \|C_i - C_j\|)$ where $C_i$ represents a vector of color values at mage element i, $C_j$ represents a vector of color values at image element j, $\|\cdot\|$ indicates vector norm, and $\beta$ is a free parameter;
means for determining potentials for each image element in the image data wherein the determined potentials represent the probability that a random walker starting at an image element in the image data first reaches a seed point in the image data when the probability of the seed point is set to unity; and means for assigning a label, based upon the determined potentials, to each image element in the image data.

33. The system of claim 32 wherein said image data represents a digital photograph.

34. The system of claim 32 wherein said color space is correlated with human visual perception.

35. The system of claim 34 wherein said color space is CIE LUV color space.

* * * * *